US005490235A

United States Patent [19]
Von Holten et al.

[11] Patent Number: 5,490,235
[45] Date of Patent: Feb. 6, 1996

[54] DIGITAL AUDIO INTERFACE IN A MOBILE TELEPHONE

[75] Inventors: Arnold Von Holten, Cascais, Portugal; Timo Kolehmainen, Oulu, Finland

[73] Assignee: Nokia Mobile Phones Ltd., Salo, Finland

[21] Appl. No.: 185,769

[22] Filed: Jan. 24, 1994

Related U.S. Application Data

[63] Continuation of Ser. No. 956,651, Oct. 2, 1992, abandoned.

[30] Foreign Application Priority Data

Oct. 3, 1991 [FI] Finland .................................. 914.657

[51] Int. Cl.⁶ .............................. G10L 9/00; H04M 11/06
[52] U.S. Cl. .............................................. 395/2.79; 379/58
[58] Field of Search ............ 380/28–33; 371/22.1–22.6; 324/120; 395/2.1, 2.79

[56] References Cited

U.S. PATENT DOCUMENTS

| | | | |
|---|---|---|---|
| 4,963,824 | 10/1990 | Hsieh et al. | 324/158 R |
| 5,023,902 | 6/1991 | Anderson et al. | 379/59 |
| 5,115,435 | 12/1992 | Langford, II et al. | 371/22.1 |
| 5,155,733 | 10/1992 | Blecha, Jr. | 371/22.1 |
| 5,159,598 | 10/1992 | Welles, II et al. | 371/22.3 |
| 5,295,178 | 3/1994 | Nickel et al. | 379/58 |
| 5,305,384 | 4/1994 | Ashby et al. | 380/29 |

FOREIGN PATENT DOCUMENTS

| | | |
|---|---|---|
| 92308569 | 5/1993 | European Pat. Off. . |
| 914657 | 4/1992 | Finland . |

OTHER PUBLICATIONS

Conference Proceedings on Area Communication by Kall, Jun. 13–17, 1988, Stockholm, Sweden, "Eurocon 88", 8th European Conference on Electrotechnics, pp. 478–481.
Patent Abstracts of Japan, vol. 8, No. 173 (E–259) (1610) Aug. 9, 1984 and JP-A-59 66 233 (Nippon Denki K.K.) 14 Apr. 1984, p. 1.

*Primary Examiner*—Allen R. MacDonald
*Assistant Examiner*—Michelle Doerrler
*Attorney, Agent, or Firm*—Perman & Green

[57] ABSTRACT

A GSM mobile telephone includes a digital audio interface for interfacing with a system simulator for test purposes. A digital signal processor within the mobile telephone includes a codec data register that interfaces to an analog codec which provides A/D and D/A conversion of speech signals. An interface circuit is connected to the codec data register and includes a digital audio interface block and a test access port data register, both of which enable test data inputs and test data outputs to be respectively fed to the mobile telephone's digital signal processor and enable test functions to be accomplished without a requirement for loading of test program into the mobile telephone station.

3 Claims, 3 Drawing Sheets

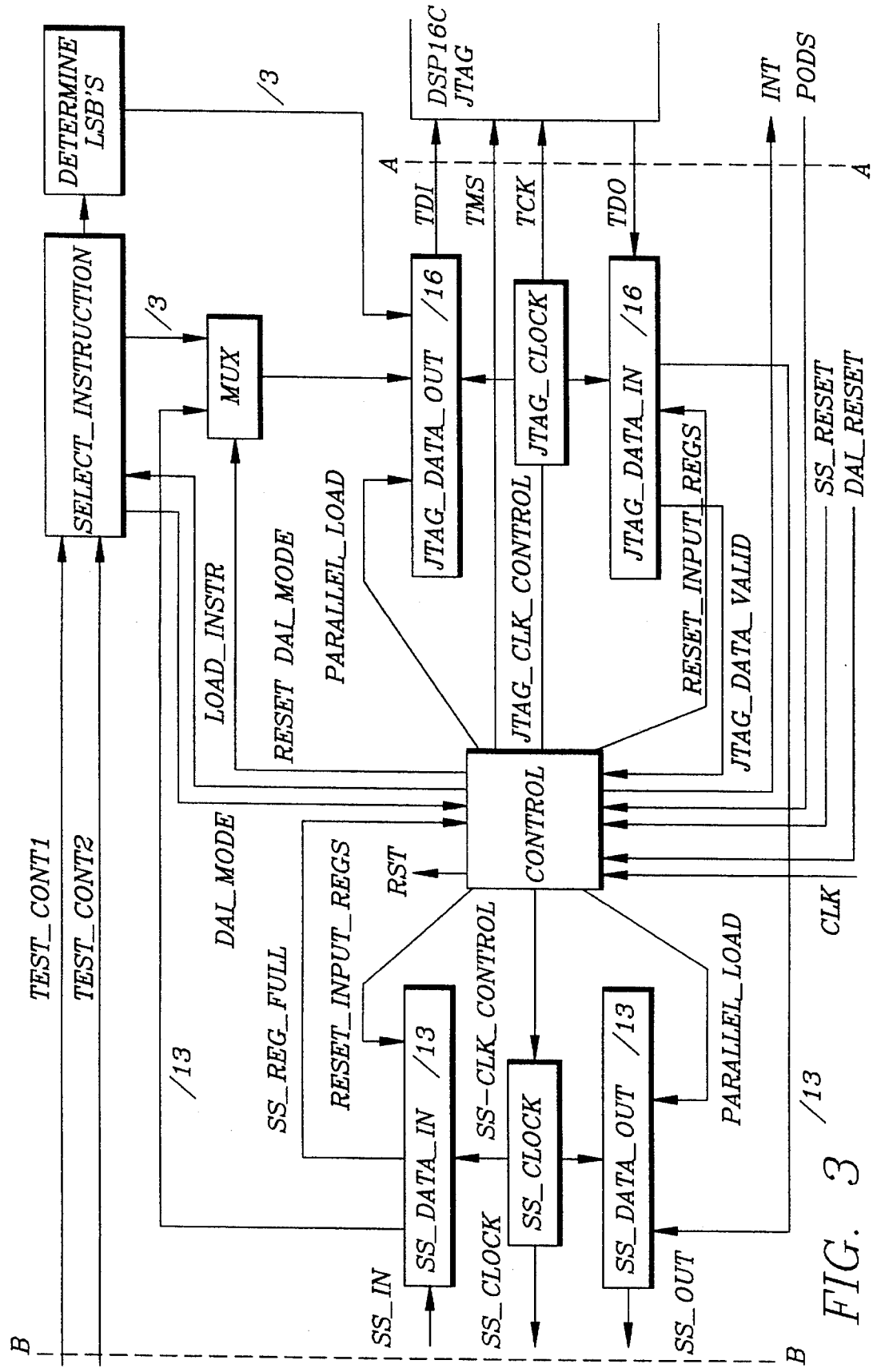

DIGITAL AUDIO INTERFACE IN A MOBILE TELEPHONE

This is a continuation of application(s) Ser. No. 07/956,651 filed on Oct. 2, 1992 now abandoned.

FIELD OF THE INVENTION

The invention relates to a digital audio interface (DAI) in a GSM-device, such as a mobile telephone station.

BACKGROUND OF THE INVENTION

The digital audio interface in a GSM system (Global Mobile System) is a specified interface between a mobile station (MS) and a GSM system simulator (SS).

This interface is used in the conformance testing of a GSM device, especially in performing the bit exact test of the speech coder/decoder and in testing the sending/receiving loudness ratio (SLR/RLR). FIG. 1 represents the MS test arrangement of a mobile station wherein the essential parts with respect to the invention are marked: in the receive direction speech coder 101, digital interface 106, digital-analog converter 105 and speaker 108, and in the transmit direction microphone 102, analog-digital converter 103, as well as digital interface 107 and speech encoder 104. According to the specification the interfaces transfer 13 bits wide linear PCM data in serial mode at 104 kbits/s. It is also possible to interface, via digital audio interface 106/107, to the system simulator SS (not shown) to connect the speech data in both the transmit and receive directions. By means of the digital audio interface it is possible to observe and control the data stream in between the D/A and A/D conversion and the coding/decoding of the digital speech signal.

In FIG. 1 the internal test loops, i.e. test paths, of the MS device required by the specification are represented by reference numbers 1 to 4. Path 1 transmits decoded speech from speech decoder 101 of the MS device to simulator SS; this path is used for down link speech transcoding testing. Path 2 transmits a signal converted by A/D converter 103 and originating from acoustic input 102 to the simulator; this path is used for the acoustic devices test. Path 3 transmits a signal from simulator SS to speech encoder 104 of the MS device; this is used for up link speech transcoding testing. Finally, path 4 transmits a signal from the simulator to A/D converter 105 and to the acoustic speech output device (speaker); this path is used for the acoustic devices test.

In digital interface 106/107 (DAI), according to the specification represented in FIG. 1, the linking of the system simulator is a very clear function because the specification is based on the assumption that the D/A and A/D converters on one hand, and the coders/decoders on the other hand, are separate physical devices with interface DAI in between.

However, the applicant has, for different reasons, reached a more cost-effective solution in realizing the mobile station MS, wherein D/A and A/D converters and coders/decoders are implemented in one physical unit. This type of unit comprises a DSP processor for the speech transcoding function and an analog codec for the D/A and A/D conversion of the speech signal, as well as codec data register CDX, through which the system simulator SS has to interface to the MS device in order to meet the DAI specifications.

However, this creates problems. One alternative is that the DSP processor reads and writes into the data register CDX and subsequently interfaces to the system simulator via a serial SIO interface (not shown). However, this means that a specific program would have to be installed in the DSP processor that takes care of transferring the speech data from the SIO port to the codec data register and vice versa. This would result in a disadvantageous situation, where the MS would not be working in normal mode (i.e. would not be working with the normal mode speech coding program) during testing. Furthermore, the use of the serial port SIO for testing purposes limits the potential future use of the port for other purposes.

SUMMARY OF THE INVENTION

This problem is solved according to the invention in such a way that a JTAG (Joint Test Action Group, IEEE 1149.1) test access port arranged in the DSP unit is connected via a test access port data register and a digital audio interface block to a codec data register contained within the DSP unit. This enables test data inputs and test data outputs to be respectively fed to a mobile telephone station via the digital audio interface block and test access port data register from a system simulator without requiring a loading of a test program into the mobile telephone station.

DESCRIPTION OF THE DRAWINGS

The invention is described in the following with the aid of an exemplary embodiment with reference to the appended drawings, where:

FIG. 3 is a more detailed block diagram of the DAI block.

DETAILED DESCRIPTION OF THE INVENTION

The basis for this above-described embodiment is a mobile device, i.e. a digital radio telephone MS for which a digital signal processor unit DSP16C was selected arranged on one chip and specified by the applicant. According to FIG. 2 this unit comprises DSP processor 11 for the speech transcoding function, analog codec (CODEC) 12 for the D/A and A/D conversion of the speech signal, and codec data register (CDX) 11*a* as well as JTAG codec data register (JCDX) 13. Test data input TDI and test data output TDO are interfaced to the JCDX and they interface the Ms to the system simulator SS via DAI block 14.

Figure 1:
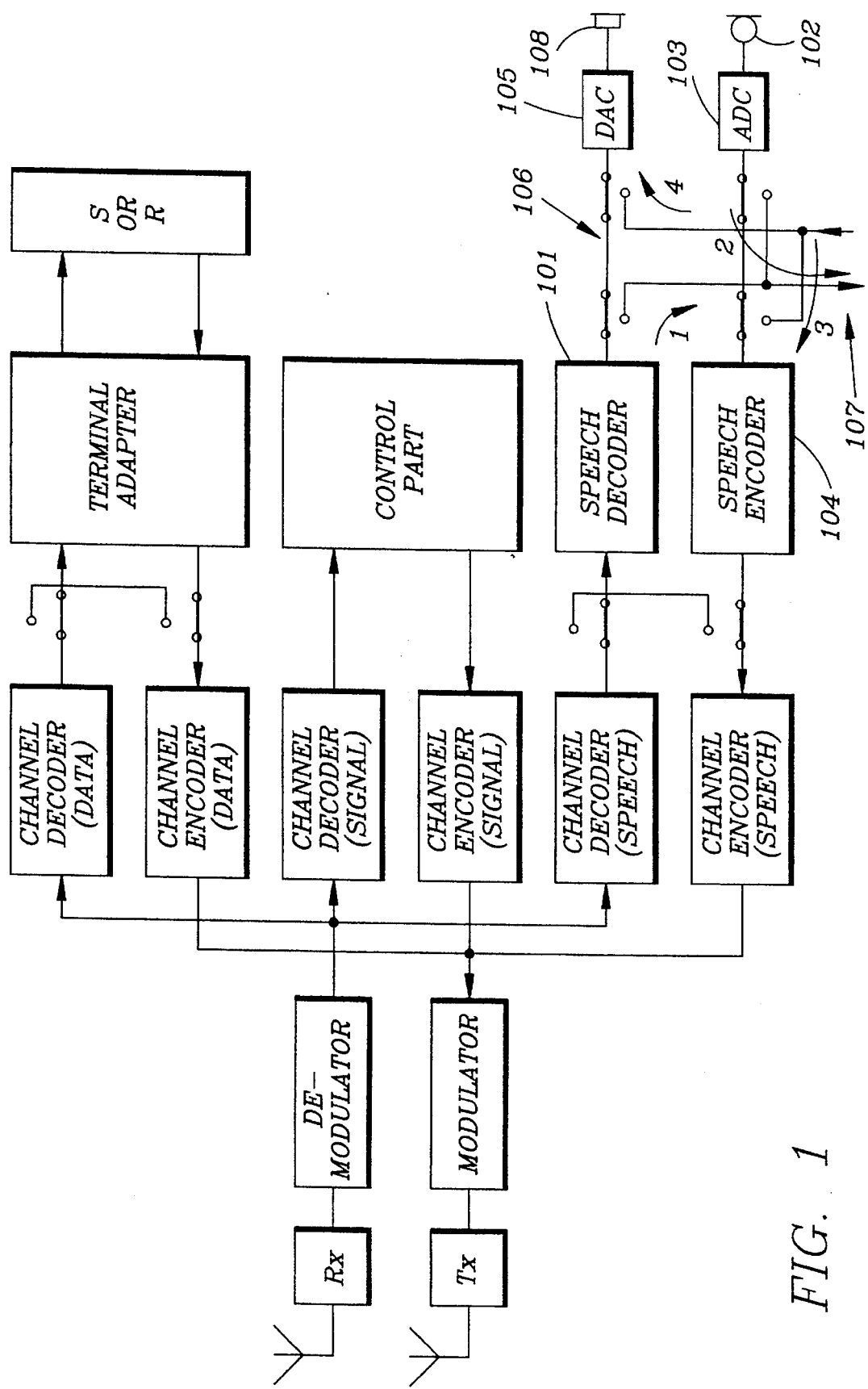
FIG. 1 represents a test loop arrangement according to the GSM specifications, whereby the members interfacing to the DAI interface and the required test paths are marked with reference numbers.
Figure 2:
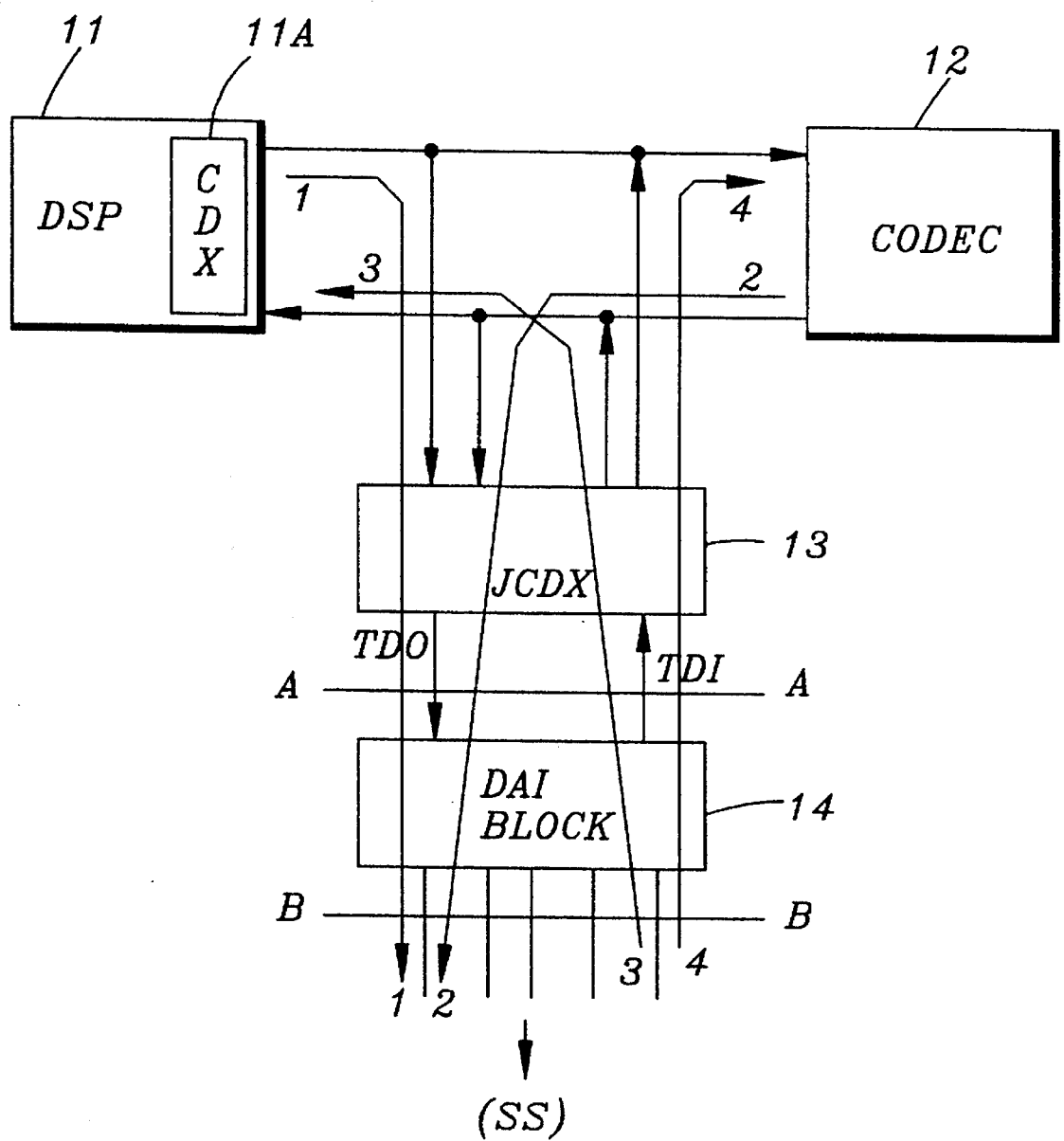
FIG. 2 represents a block diagram of the DAI arrangement according to the invention with the implementation of the test paths according to FIG. 1.

Data from DSP processor 11 can be transmitted to JCDX register 13 via codec data register 11*a*, and, on the other hand, from codec 12. Correspondingly, register 13 can write in either direction, that is, to register 11*a* and codec 12. FIG. 2 also shows how test paths 1 to 4 of the specification according to FIG. 1 are implemented in the DAI arrangement according to the invention.

The set of commands of the DSP processor further includes two special JTAG commands which make it possible to determine from which direction JCDX register 13 reads and where it writes. The "Program Test" command directs the JCDX register to read path 1 and to write path 3 towards processor 11; thus codec 12 is not connected to the JCDX register. Correspondingly, the "Codec Test" command directs the JCDX register to read path 2 and write path 4 towards codec 12; thus processor 11 is not connected to the JCDX register.

The above-mentioned commands can be given from the system simulator SS via DAI block 14.

The essential feature of the invention is that the DAI interface is completely hardware-based. The interface is marked in FIG. 2 by line B—B. Consequently no special test configuration is necessary in the radio telephone to implement paths 1 to 4. No test program for testing needs to be loaded in the processor either. Only the two commands mentioned are needed for the DAI arrangement. When a command related to JCDX register 13 is given via the DAI block the hardware configuration of the DSPC16C unit is modified in order to form the test paths shown in FIG. 2.

FIG. 3 shows the construction of DAI block 14 in more detail. DAI interface B—B via which the MS interfaces to the SS via five leads is shown on the left in the figure. Correspondingly interface A—A (also in FIG. 2) via which the DAI block interfaces to JTAG data codec register (JCDX) 13 of the DSP processor is on the right. DAI block 14 comprises a control block (CONTROL) which controls the transfer of data between the SS data registers on the left in the figure and the JTAG data registers on the right. The data transfer is controlled by clock lines "SS clock" and "TCK". On the top of FIG. 3 there are control lines "test cent 1" and "test cent 2" which come from the system simulator on the left and which enable the SS to control the DAI block and thus also JTAG register 13 to different states via block "Select instruction". In other respects the markings in the block diagram in FIG. 3 are clear to those skilled in the art.

We claim:

1. A mobile telephone station comprising:

a digital signal processor (DSP) for coding and decoding speech signals and including a codec data register;

an analog codec coupled by an electrical circuit to said codec data register, for converting digital speech signals received from said codec data register in said DSP to analogue speech signals and for converting received analogue speech signals to digital speech signals and for feeding said digital speech signals to said codec data register in said DSP, said electrical circuit comprising a first circuit for coupling signals from said analog codec to said DSP and a second circuit for coupling signals from said DSP to said analog codec; and an interface circuit connected in parallel with said analog codec and to said electrical circuit, said interface circuit having inputs connected to said first circuit and second circuit and outputs connected to said first circuit and second circuit, said interface circuit including a digital audio interface block that is connectable to a system simulator and furthermore including a test access port data register coupled to said digital audio interface block and further connected to said electrical circuit between said digital audio interface block and said codec data register, whereby test data inputs and test data outputs are respectively fed to said mobile telephone station via said digital audio interface block and test access port data register from a connected system simulator, without a requirement for loading of a test program into said mobile telephone station.

2. The mobile telephone station as recited in claim 1, wherein said DSP includes plural commands which implement reading and writing procedures for data contained in said test access port data register.

3. The mobile telephone station as recited in claim 2, wherein said plural commands are loaded into said DSP from a said system simulator via said test access port data register.

* * * * *